(12) United States Patent
Zhang et al.

(10) Patent No.: US 12,503,993 B2
(45) Date of Patent: Dec. 23, 2025

(54) METHOD FOR SELF-COMPENSATION STRUCTURE OF CAM-LOBE HYDRAULIC MOTOR PLATE DISTRIBUTION SYSTEM

(71) Applicant: ZHEJIANG UNIVERSITY, Zhejiang (CN)

(72) Inventors: Chao Zhang, Hangzhou (CN); Xiaolong Zhang, Hangzhou (CN); Yu Fang, Hangzhou (CN); Huaizhi Zong, Hangzhou (CN); Junhui Zhang, Hangzhou (CN); Bing Xu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 88 days.

(21) Appl. No.: 18/648,383

(22) Filed: Apr. 28, 2024

(65) Prior Publication Data

US 2024/0280120 A1  Aug. 22, 2024

Related U.S. Application Data

(63) Continuation of application No. PCT/CN2023/082943, filed on Mar. 22, 2023.

(30) Foreign Application Priority Data

Dec. 15, 2022  (CN) .......................... 202211612099.1

(51) Int. Cl.
*F03C 1/30* (2006.01)
*F03C 1/06* (2006.01)
(Continued)

(52) U.S. Cl.
CPC .......... *F03C 1/0409* (2013.01); *F03C 1/0444* (2013.01); *F03C 1/0647* (2013.01);
(Continued)

(58) Field of Classification Search
CPC ...... F15B 19/007; F15B 21/00; F03C 1/0409; F03C 1/0444; F03C 1/0647; F03C 1/2021; F04B 1/2021
See application file for complete search history.

(56) References Cited

U.S. PATENT DOCUMENTS 2,397,314 A * 3/1946 Grosser ................. F01B 13/062
                                                    91/485
3,155,047 A * 11/1964 Keel ..................... F03C 1/2407
                                                    91/485
(Continued)

FOREIGN PATENT DOCUMENTS

| CN | 103696956 A | 4/2014 |
| CN | 108071551 A | 5/2018 |

(Continued)

OTHER PUBLICATIONS

International Search Report (PCT/CN2023/082943); Date of Mailing: Jul. 15, 2023.
(Continued)

*Primary Examiner* — Dustin T Nguyen
(74) *Attorney, Agent, or Firm* — Wiersch Law Group

(57) ABSTRACT

Provided is a design method for a self-compensation structure of a cam-lobe hydraulic motor plate distribution system, which comprises that follow steps: firstly, establishing a force balance equation, a pressure distribution equation and a flow balance equation for each balance chamber, setting a boundary condition, and setting an expected nominal clearance; selecting a fit clearance for simultaneous solutions, and obtaining a set of solutions of areas; taking a maximum value in this set of solutions as the median, and setting a set of area values in the optimization design; further solving changing curves of the nominal clearance and the total leakage of the distribution system with the rotation angle of the cylinder block, and calculating the average value of (Continued)

various curves after the operation is smooth, and designing the self-compensation structure based on selection of the optimal combination of the fit clearance and area.

1 Claim, 6 Drawing Sheets

(51) Int. Cl.
    *F03C 1/38*     (2006.01)
    *F04B 1/188*     (2020.01)
    *F04B 1/2021*     (2020.01)
    *F03C 1/34*     (2006.01)
    *F15B 19/00*     (2006.01)

(52) U.S. Cl.
    CPC .......... *F04B 1/188* (2013.01); *F04B 1/2021* (2013.01); *F03C 1/0435* (2013.01); *F15B 19/007* (2013.01)

(56) References Cited

U.S. PATENT DOCUMENTS 3,396,536 A * 8/1968 Miller .................. F16H 61/433
    91/506
4,381,701 A * 5/1983 Maistrelli ............ F03C 1/0681
    91/499

FOREIGN PATENT DOCUMENTS

| | | |
|---|---|---|
| CN | 208416836 U | 1/2019 |
| CN | 110067717 A | 7/2019 |
| CN | 111456923 A | 7/2020 |
| DE | 19653591 C1 | 1/1998 |
| GB | 1405074 A | 9/1975 |
| WO | 2018090159 A1 | 5/2018 |

OTHER PUBLICATIONS

First Office Action(CN202211612099.1); Date of Mailing: Jan. 30, 2023.
Notice of Allowance(CN202211612099.1); Date of Mailing: Feb. 21, 2023.
Research-on-micron-electrohydraulic-positi-on-feedback-control-system.

* cited by examiner

METHOD FOR SELF-COMPENSATION STRUCTURE OF CAM-LOBE HYDRAULIC MOTOR PLATE DISTRIBUTION SYSTEM

CROSS-REFERENCE TO RELATED APPLICATIONS

The present application is a continuation of International Application No. PCT/CN2023/082943, filed on Mar. 22, 2023, which claims priority to Chinese Application No. 202211612099.1, filed on Dec. 15, 2022, the contents of both of which are incorporated herein by reference in their entireties.

TECHNICAL FIELD

The present application belongs to the field of structural optimization design of hydraulic motor parts and, in particular, to a design method for a self-compensation structure of a cam-lobe hydraulic motor plate distribution system.

BACKGROUND

The main feature of a cam-lobe hydraulic motor is that the piston reciprocates for multiple times in the piston chamber during in one revolution of the motor. The cam-lobe characteristics make this kind of motor have the advantages of high power density, high efficiency, small pulsation and good low-speed stability. Therefore, cam-lobe motors are widely used in both military and civilian fields, such as winch systems of destroyers and scientific research ships in the military field; rotary drive systems for shield machines, wind power generation, piling boats, dredgers, crushers, double-wheel milling, TRD construction machinery, boring machines, steel rolling transmission lines, rolling machines, injection molding machines and other large equipment in the civil field.

The distribution system in the cam-lobe hydraulic motor is the core component to ensure its normal operation, and its main function is to periodically communicate the high- and low-pressure oil ports of the motor with the corresponding piston chambers to realize oil distribution. At the same time, when the piston is switched between retraction and extension, the piston chamber is separated from the high- and low-pressure oil ports of the motor.

At present, there are three main types of distribution systems in cam-lobe hydraulic motors: the first type is valve distribution, which is complex in structure and is generally used for motors with water and high water-based media; the second type is shaft distribution, which has a simple structure, but requires high machining and assembly accuracy to ensure normal operation, sealing and oil distribution effects, and is very sensitive to the "thermal shock" of hydraulic oil (when the cold motor starts, hot oil is input to cause the distribution shaft to expand and get stuck), and at the same times since the leakage gradually increases and the volumetric efficiency gradually decreases with the wear and tear in the working process, and therefore is relatively less used; the third type is plate distribution (end distribution), which has a simple and compact structure and a high bearing capacity, and can be designed in the form of a self-compensation structure to realize automatic compensation for the wear of the distribution pair and improve the volumetric efficiency and starting reliability of cam-lobe motor. This self-compensation distribution plate is widely used at present.

The self-compensation structure of the plate distribution system presses the distribution end face of the distribution plate on the piston port end face of the cylinder block of the motor, and a plurality of oil ports are distributed on the piston port end face of the cylinder block to communicate with the piston chamber on the cylinder block, and the pressure of each oil port acts on the distribution end face of the distribution plate to form a hydraulic support force for separating the distribution plate from the cylinder block. With the rotation of the motor (the cylinder block rotates relative to the distribution plate), the pressure of each oil port on the piston port end face of the cylinder block alternately changes between high and low pressures, and the hydraulic support force separating the distribution plate from the cylinder block is constantly changing; if the size design of the self-compensation structure responsible for compaction in the distribution system is unreasonable, it is likely to lead to insufficient compaction force, separation of the distribution plate from the cylinder block and increased leakage; or the pressing force is too great, resulting in serious wear of the distribution plate ("burning plate"). Therefore, the reasonable design of the size of the self-compensation structure is an important prerequisite to ensure the working quality of the self-compensation distribution plate and cam-lobe motor. However, there is no design method for the optimal size of the self-compensation structure at present.

SUMMARY

The present application aims at overcoming that defect of the prior art, and provides a design method for a self-compensation structure of a cam-lobe hydraulic motor plate distribution system, so as to improve the efficiency and service life of the self-compensation distribution plate.

The object of the present application is achieved through the following technical solution: a design method for a self-compensation structure of a cam-lobe hydraulic motor plate distribution system, including the following steps:

Step S1, performing a mechanical analysis on a distribution plate to obtain a force balance equation of two sides of the distribution plate;

Step S2, establishing an oil film pressure distribution equation on a distribution end face of the distribution plate;

Step S3, establishing a flow balance equation for each balance chamber of the self-compensation structure;

Step S4, setting a boundary condition for solving the oil film pressure distribution equation in Step 2 by combing the flow balance equations in Step 3;

Step S5, setting a desired nominal clearance between the distribution end face of the distribution plate and a piston port end face of a cylinder block;

Step S6, setting a set of fit clearance values between the self-compensation structure and the distribution plate according to a requirement, selecting a minimum fit clearance in the set, solving the oil film pressure distribution equation and the flow balance equations by combining the desired nominal clearance and the boundary condition to obtain oil film pressures and balance chamber pressures when the cylinder block rotates at different angles relative to the distribution plate, solving the force balance equation to obtain a set of solutions of an area S when the cylinder block rotates at different angles relative to the distribution plate, and taking a maximum value in the set of solutions as a median and setting a set of area values for an optimization design;

Step 7, combining values in the set of fit clearance values and values in the set of area values in pairs, solving the oil film pressure distribution equation and the flow balance equations by combining the boundary condition, and simulating changes of the oil film pressure and the balance chamber pressure on the distribution end face when the cylinder block rotates at different angles relative to the distribution plate to obtain change curves of the nominal clearance of the distribution end face and a total leakage of the cam-lobe hydraulic motor plate distribution system with a rotation angle of the cylinder block; and Step S8, taking an average value after the distribution plate works smoothly according to the change curves calculated in Step S7, selecting an optimal combination of a fit clearance and an area as a final optimization result, and completing a design for the self-compensation structure according to the final optimization result.

Further, the force balance equation of the distribution plate indicates that a vector sum of all forces acting on a pistonis 0.

Further, the oil film pressure distribution equation of the distribution end face of the distribution plate is obtained through lubrication analysis, and is used for solving an oil film pressure distribution and an oil flow velocity distribution at each part of the distribution end face.

Further, the balance chambers are columnar, uniformly distributed on the distribution plate, and located at an opposite side of the distribution end face of the distribution plate, and oil at the distribution end face enters the balance chambers through small holes thereof.

Further, each of the balance chambers has the self-compensation structure inside, the self-compensation structure is a columnar structure, and has a sealing effect on the balance chamber; and the self-compensation structure slides along an inner wall of each of the balance chambers, but cannot completely slide out of the balance chamber.

Further, the flow balance equation in each of the balance chambers of the self-compensation structure is configured to calculate the balance chamber pressure in a transitional state, and the transitional state means that the balance chamber is not communicated with a piston chamber oil port on the cylinder block.

Further, in Step S6, the set of fit clearance values c is set as $C=\{c_1, c_2, c_3, \ldots, c_k\}$, where $c_1 \ldots c_k$ gradually increases.

Further, in Step S6, the set of solutions of the area S when the cylinder block rotates at different angles relative to the distribution plate is S', and the maximum value $S'_{max}$ in S' is set as the median of a value range of the area S in the optimization design; and the values of the area S before and after the median are designed according to actual requirements, that is, the set of values of the area S is $SS=\{S_1, S_2, S_3, \ldots, S_m, S'_{max}, S_{m+2}, \ldots, S_{2m+1}\}$, where $S_1 \ldots S_{2m+1}$ gradually increases.

Further, in Step S8, the average value of the change curves calculated in Step S7 after the distribution plate works smoothly is taken to obtain an average nominal clearance $\bar{h}_0$ and an average leakage $\bar{Q}_3$ in the combination of the fit clearance and the area; and a combination of the fit clearance c and the area S that has a minimum average leakage $\bar{Q}_3$ is selected as the final optimization result under a condition that $\bar{h}_0$ is ensured to be greater than the desired nominal clearance $h'_0$ between the distribution end face of the distribution plate and the piston port end face of the cylinder block set in Step S5, and a design of the self-compensation structure is completed according to the final optimization result. In some embodiments, each balance chamber has a corresponding self-compensation structure.

Further, in Step S6, the area S is a projected area of the self-compensation structure on the distribution end face of the distribution plate, and a pressing force generated by the self-compensation structure on the distribution end face of the distribution plate is obtained by multiplying the area S by the pressure in the corresponding balance chamber; and in Step S8, the smooth operation of the distribution plate means that at the moment the nominal clearance fluctuates periodically with the rotation angle of the cylinder block.

The present application has the advantages that the design method provided by the present application can realize the rapid and low-cost optimization design of a self-compensation structure, shorten the design period of a cam-lobe hydraulic motor plate distribution system, and the designed self-compensation structure can effectively reduce the leakage of the distribution system and ensure good lubrication between the distribution end face of the distribution plate and the piston port end face of the cylinder block.

The reference signs in the attached drawings: 1—Cylinder block, 2—Piston chamber oil port, 3—Self-compensation structure, 4—Distribution plate, 5—Shell, 6—Floating sealing sleeve, 7—Low pressure oil distribution window, 8—Balance chamber, 9—High pressure oil distribution window and 10—Spring.

DESCRIPTION OF EMBODIMENTS

In order to explain the embodiment of the present application more clearly, the present application will be further explained with the attached drawings and specific embodiments.

Figure 1:
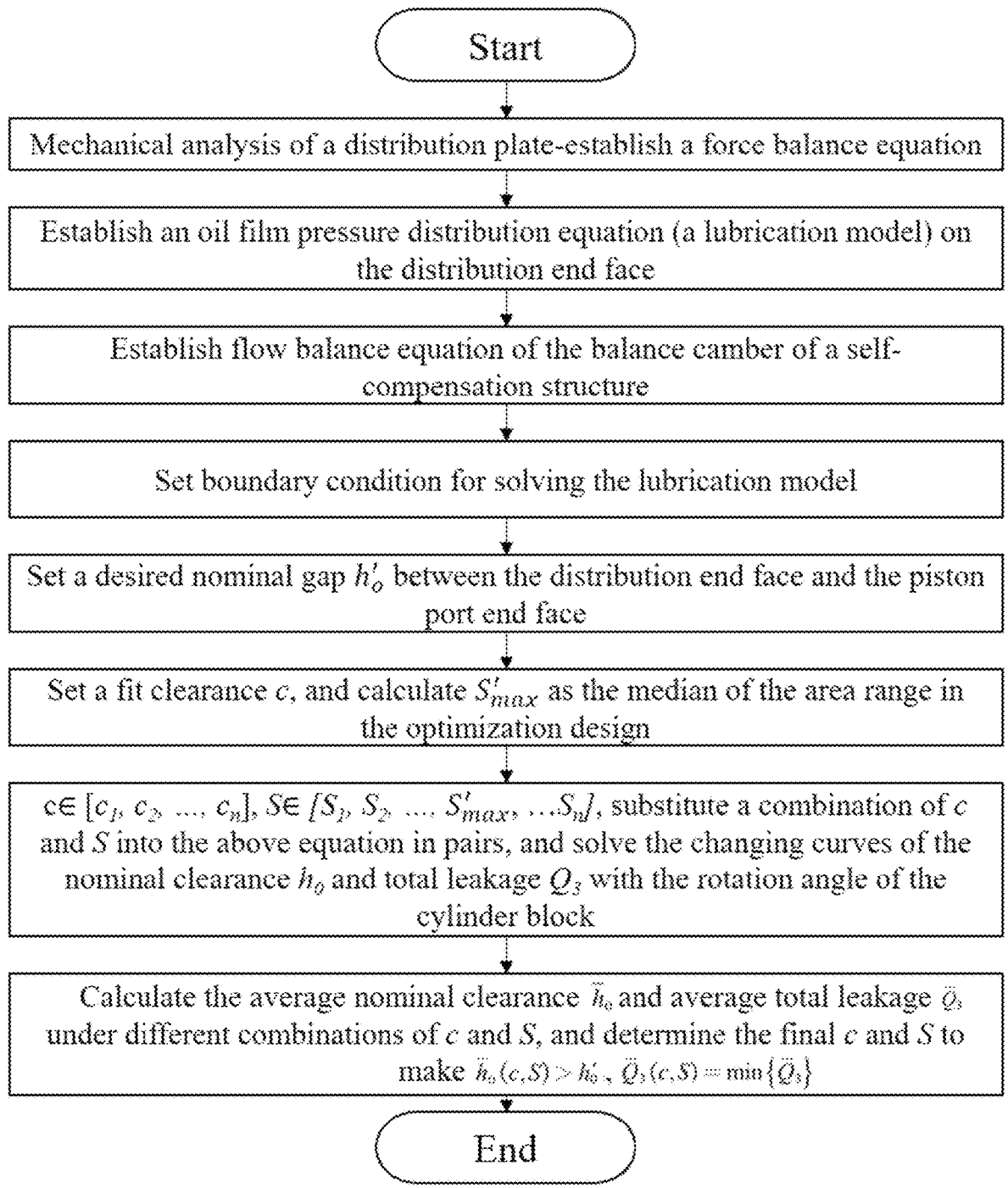
FIG. 1 is a flow chart of a design method for a self-compensation structure.

As shown in FIG. 1, the present application provides a design method for a self-compensation structure of a cam-lobe hydraulic motor plate distribution system, which reduces the leakage and wear of the distribution system by optimizing the projected area of the self-compensation structure on the distribution end face and the fit clearance between the self-compensation structure and the distribution plate. In the distribution system, one side of the distribution plate is the distribution end face, and the back side is an oil inlet and an oil discharge port of the distribution plate. With the changes of the oil pressure, the rotation speed and wear during the rotation of the motor, the distribution plate moves along the self-compensation structure, and the distance between the distribution end face of the distribution plate and the piston port end face of the cylinder block is automatically adjusted to realize automatic compensation. The oil in the high-pressure oil distribution window and the low-pressure oil distribution window of the distribution plate will periodically enter the balance chambers of the self-compensation structure to provide a pressing force for the distribution plate; and the pressing force reduces the fit clearance between the distribution end face of the distribution plate and the piston port end face of the cylinder block, thus ensuring the sealing between the distribution plate and the cylinder block.

Figure 2:
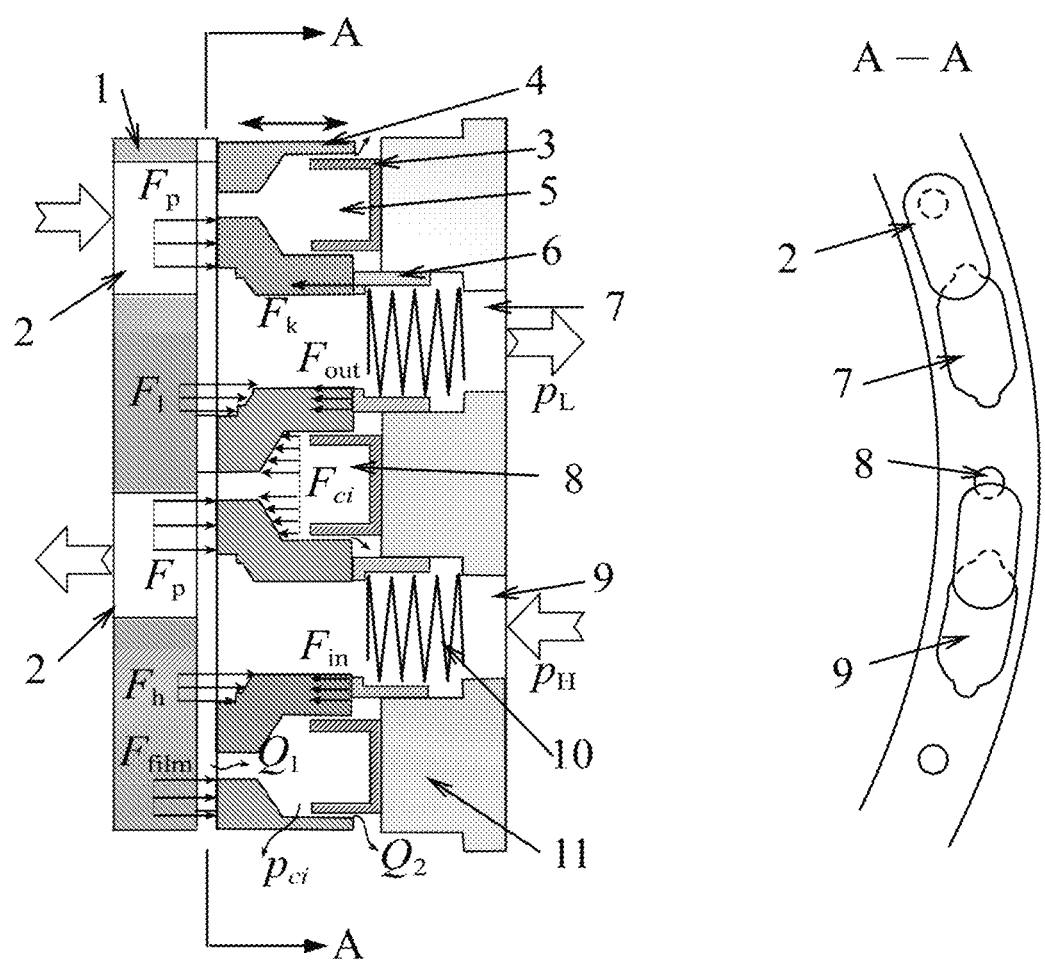
FIG. 2 is a structural principle and stress diagram of a self-compensation distribution system.
Figure 3:
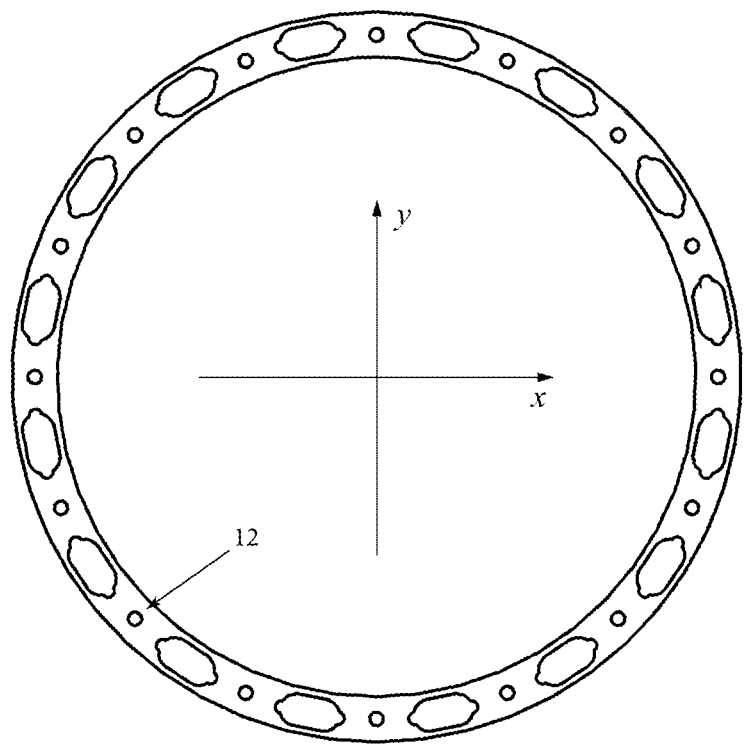
FIG. 3 is a schematic diagram of a distribution end face.
Figure 4:
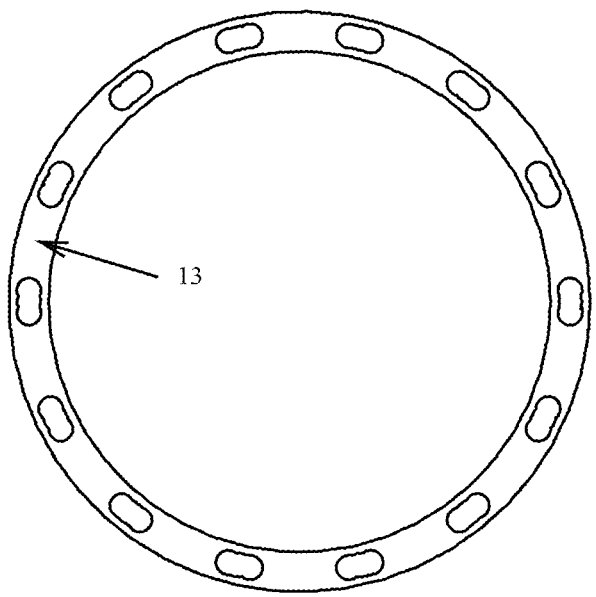
FIG. 4 is a schematic diagram of a piston port end face.

The specific design step of the present application are as follows:

Taking a self-compensation distribution system of an eight-acting fourteen-piston hydraulic motor as an example, as shown in FIG. 2, the partial sectional view of the distribution system consists of a distribution plate 4, a self-compensation structure 3, a spring 10 and a floating sealing sleeve 6; the complete distribution end face 12 of the distribution plate 4 is shown in FIG. 3, and the distribution end face 12 is pressed against the piston port end face 13 of the cylinder block 1, which is shown in FIG. 4.

The self-compensation structure 3 is a cylindrical cover structure, which realizes the sealing of the balance chamber 8, maintains the internal pressure of the balance chamber 8, and provides the leftwards pressing force $F_{ci}$ for the distribution plate 4; the right end of the self-compensation structure 3 is pressed against the fixed shell 11 of the motor, and the distribution plate 4 can move along the self-compensation structure 3 according to the force difference between the left and right sides to realize the self-compensation function; since the self-compensation structure 3 is cylindrical, its projected area S on the distribution end face of the distribution plate can be represented by a diameter D, and thus the two key dimensions of the self-compensation structure 3 are its outer cylindrical diameter D and the fit clearance c between the self-compensation structure 3 and the distribution plate 4, both of which will affect the leftward pressing force and leakage of the distribution plate; The excircle diameter D and the fit clearance c are the parameters to be optimized for the self-compensation structure of this embodiment.

Step 1: a mechanical analysis is carried out for the distribution plate; as shown in FIG. 2, the distribution plate 4 is subjected to an oil film force $F_{film}$, a hydraulic pressure $F_p$ of the piston chamber oil port 2, a hydraulic pressure $F_h$ on the transition inclined plane of eight high-pressure oil distribution windows 9, a hydraulic pressure $F_1$ on the transition inclined plane of eight low-pressure oil distribution windows 7, a hydraulic pressure $F_{ci}$ of sixteen balance chambers 8, an elastic force $F_k$ of sixteen springs 10, a pressing force $F_{in}$ of the floating sealing sleeve 6 at eight high-pressure oil inlets, a pressing force $F_{out}$ of the floating sealing sleeve 6 at eight low-pressure oil outlets, and an acting force $F_x$ of the internal pressure of the motor shell on the distribution plate 4; a force balance equation of the distribution plate is established, and the resultant force F is 0:

$$\sum F = F_{film} + F_p + F_h + F_1 + F_x - F_{ci} - F_k - F_{in} - F_{out} = 0$$

The oil film force $F_{film}$ in step 1 is obtained by integrating the oil film pressure p distributed on the distribution end face; the hydraulic pressure $F_p$ is the total acting force generated by the oil of fourteen piston chamber oil ports 2 on the distribution end face 12, and the acting force of each piston chamber oil port 2 is calculated by multiplying the pressure $p_p$ of the piston chamber with the overlapping area $S_p$; the overlapping area $S_p$ is the area of the overlapping area between the piston chamber oil port 2 and the distribution end face 12; the hydraulic pressure $F_{ci}$ is the product of the pressure $p_{ci}$ in the balance chamber 8 and the projected area S of the self-compensation structure 3 on the distribution end face 12; for this embodiment, the projected area S is calculated from the diameter D of the self-compensation structure 3.

Step 2: an oil film pressure distribution equation (a lubrication model) on the distribution plate end face 12 is established to calculate the supporting force between the distribution plate end face and the piston port end face of the cylinder block and the leakage of the distribution pair, and the supporting force separates the distribution plate from the cylinder block;

$$\frac{\partial p}{\partial x}\left(\frac{\rho h^3}{12\mu}\frac{\partial p}{\partial x}\right) + \frac{\partial p}{\partial y}\left(\frac{\rho h^3}{12\mu}\frac{\partial p}{\partial y}\right) = \frac{1}{2}\frac{\partial \rho u h}{\partial x} + \frac{1}{2}\frac{\partial \rho v h}{\partial y} + \frac{\partial h}{\partial t}$$

where p represents the oil film pressure at a certain point on the distribution end face 12, and x represents the horizontal coordinate of each point on the distribution end face 12; as shown in FIG. 3, y represents the vertical coordinate of each point on the distribution end face 12, ρ is the oil density at each point on the distribution end face, t is the time, μ is the oil viscosity, h is the oil film thickness at a certain point of the friction pair, u is the speed of a certain point on the piston port end face 13 relative to the x axis, and v is the velocity of a point on the piston port end face 13 relative to the y axis.

The thickness of the oil film is calculated by the following equation:

$$h = h_0 + \Delta h$$

where $h_0$ is the nominal clearance between the distribution end face 12 and the piston port end face 13, and $\Delta h$ is the deformation caused by pressure at a certain point between the distribution end face 12 and the piston port end face 13.

Step 3: a flow balance equation is established for the balance chamber where the self-compensation structure is located, and the pressure $p_{ci}$ in the balance chamber 8 in a transitional state is calculated, wherein the net flow $\Sigma Q$ of the balance chamber 8 is 0:

$$\sum Q = Q_1 - Q_2 - V_0(p_{ci} - p_{ci0})/K_{oil}$$

As shown in FIG. 2, in the formula, $\Sigma Q$ is the net flow of the balance chamber, $Q_1$ is the flow flowing into the balance chamber 8 from the distribution end face, $Q_2$ is the flow of the balance chamber 8 leaking from the fit clearance c, $V_0$ is the volume of the balance chamber 8, $p_{ci0}$ is the pressure of the balance chamber 8 at a previous moment, and $K_{oil}$ is the volume elastic modulus of the oil; the transitional state of the balance chamber 8 is the state when the balance chamber 8 is not communicated with the piston chamber oil port 2, at which time, the pressure $p_{ci}$ of the balance chamber is unknown and changes with time, which needs to be calculated according to the above flow balance equation; when the balance chamber 8 is communicated with the piston chamber oil port 2, the pressure $p_{ci}$ of the balance chamber is equal to the pressure of the communicated piston chamber oil port, which is a known quantity and does not need to be calculated by the flow balance equation.

Step 4: a boundary condition for solving the pressure distribution equation in step 2 is set by combining the flow balance equations in step 3; the boundary condition is as follows: the pressure on the boundary connected with the high-pressure distribution window 9 is set as the oil inlet pressure $p_H$ of the motor, the pressure on the boundary connected with the low-pressure distribution window 7 is set as the oil discharge pressure $p_L$ of the motor, the pressure on the boundary connected with the internal chamber of the motor is set as the oil discharge pressure $p_x$ of the motor, and the pressure on the boundary connected with the balance chamber 8 is set as $p_{ci}$.

Step 5: the desired nominal clearance $h'_0$ on the distribution end face 12 is determined according to the surface roughness of the distribution end face 12 and the piston port end face 13; in this embodiment, $h'_0$ is $2\sqrt{f_1^2+f_2^2}$, where $f_1$ and $f_2$ are the surface roughness of the distribution end face 12 and the piston port end face 13 respectively.

Figure 5:
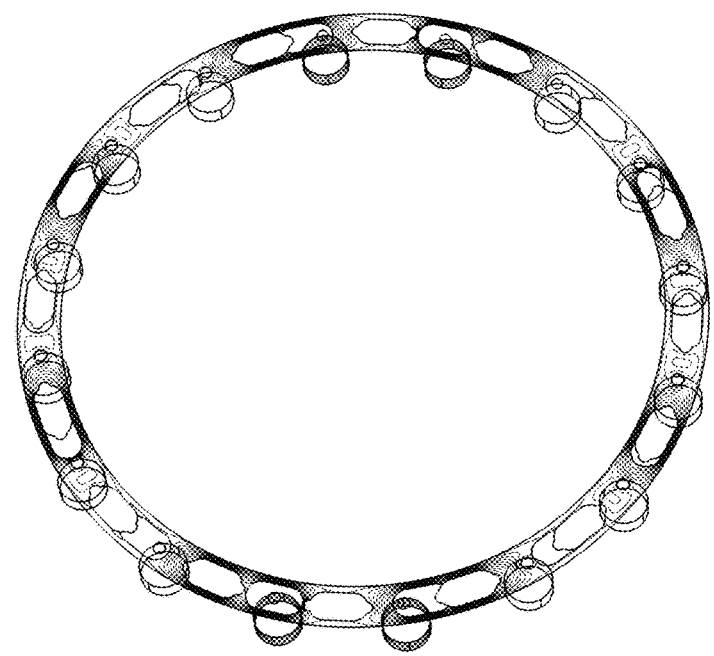
FIG. 5 is a schematic diagram of the oil film pressure distribution at the distribution end face and fit clearance.

Step 6: the set of values of the fit clearance c is set as C={2, 2.5, 3, 3.5, . . . , 21.5, 22} microns, and in this step, the fit clearance c=2 microns is selected; the equations in steps 2 and 3 are solved by combining the $h'_0$ determined in step 5 and the boundary condition in step 4 to obtain a set S' of solutions of the area S when the cylinder block rotates at different angles relative to the distribution plate; the maximum value $S'_{max}$ in S' is set as the median of a value range of the area S in the optimization design; and the values of the area S before and after the median are designed according to actual requirements, that is, the set of values of the area S is SS={$S_1$, $S_2$, $S_3$, . . . , $S_m$, $S'_{max}$, $S_{m+2}$, . . . , $S_{2m+1}$}, where $S_1$ . . . $S_{2m+1}$ gradually increases; in this embodiment, the oil film pressure c and the balance chamber pressure $p_{ci}$ when the cylinder block 1 rotates at different angles relative to the distribution plate 4 are obtained, and the result when the cylinder block 1 rotates at 270 degrees relative to the distribution plate 4 is shown in FIG. 5, in which the denser the lines, the greater the pressure; based on the oil film pressure v and the balance chamber pressure $p_{ci}$ at different angles, the force balance equation in step 1 is solved; and a set D' of solutions for the diameter D at different angles is obtained, the maximum value in D' is $D_t$=16 mm, and the set of values of the diameter D for optimization is set as DD={9, 10, 11, . . . , 16, 21, 22, 23} mm.

Figure 6:
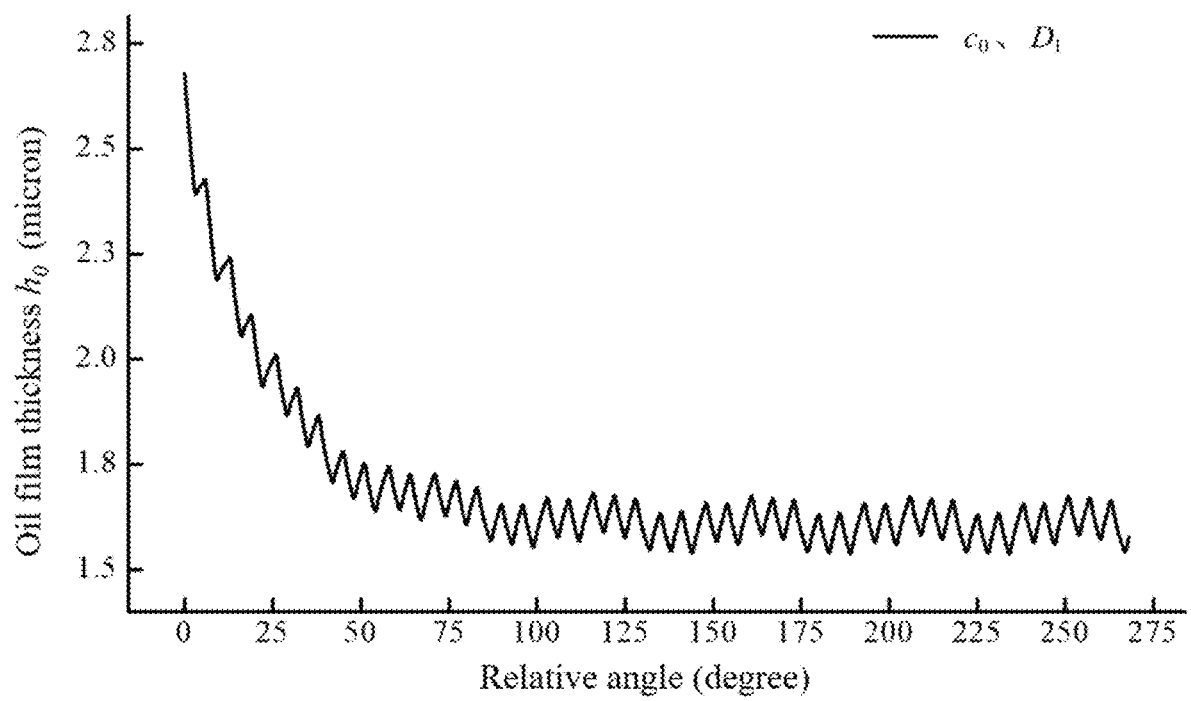
FIG. 6 is a changing curve of a nominal clearance $h_0$ with the rotation angle of a motor when the fit clearance is 5 microns and the diameter d is 16 mm.
Figure 7:
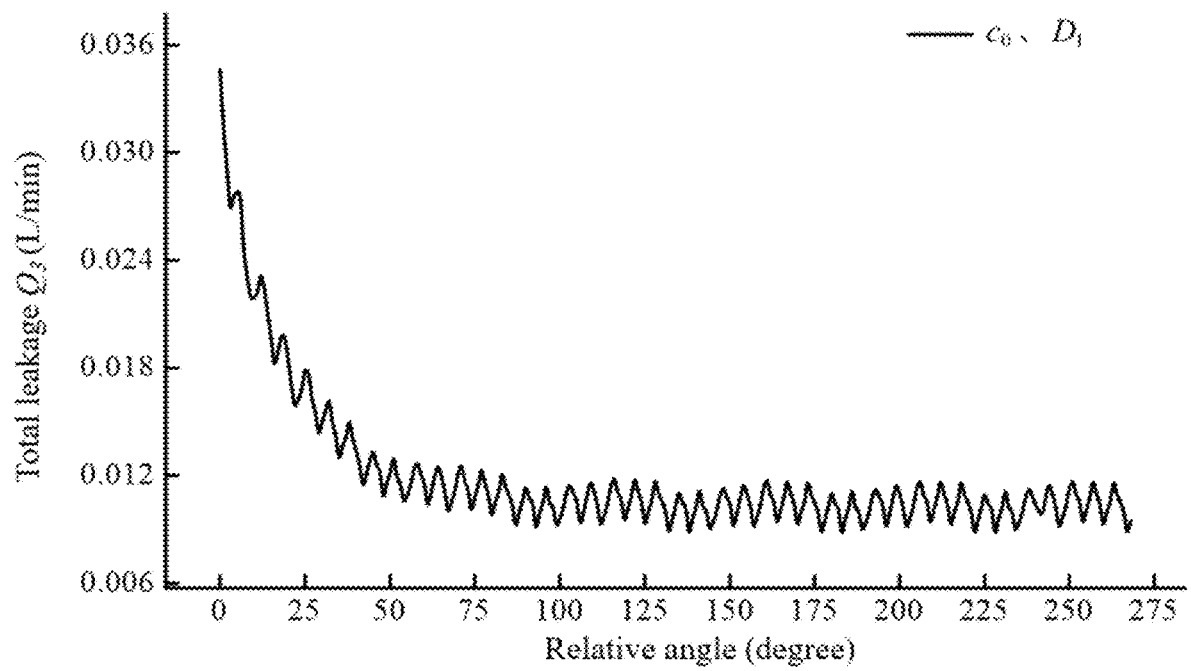
FIG. 7 is a changing curve of a total leakage $Q_3$ with the rotation angle of a motor when the fit clearance is 5 microns and the diameter d is 16 mm.

Step 7: the values of 41 fit clearances c in the set C are combined with the values of 15 diameters D in the DD set in pairs, and the equations in step 2 and step 3 are solved in combination with the boundary condition in step 4, so as to simulate the changes of the oil film pressure p and balance chamber pressure $p_{ci}$ on the distribution plate 12 when the cylinder block 1 rotates at different angles relative to the distribution plate 4; the calculation result for each angle should ensure that the force balance equation in step 1 is established; after post-processing the simulation results, the change curves of the nominal clearance $h_0$ and the leakage $Q_3$ of the distribution plate end face 12 when the cylinder block 1 rotates at different angles relative to the distribution plate 4 for 41×15 combinations of the fit clearances c and diameters D are obtained, where the changing curves of the nominal clearance $h_0$ and the leakage $Q_3$ for the combination of c=5 and D=16 are shown in FIGS. 6 and 7 respectively; the leakage $Q_3$ is the sum of the leakage of the distribution system, including the leakage flow $Q_0$ of the distribution end face 12 and the leakage flow $Q_2$ of the self-compensation structure 3.

Figure 8:
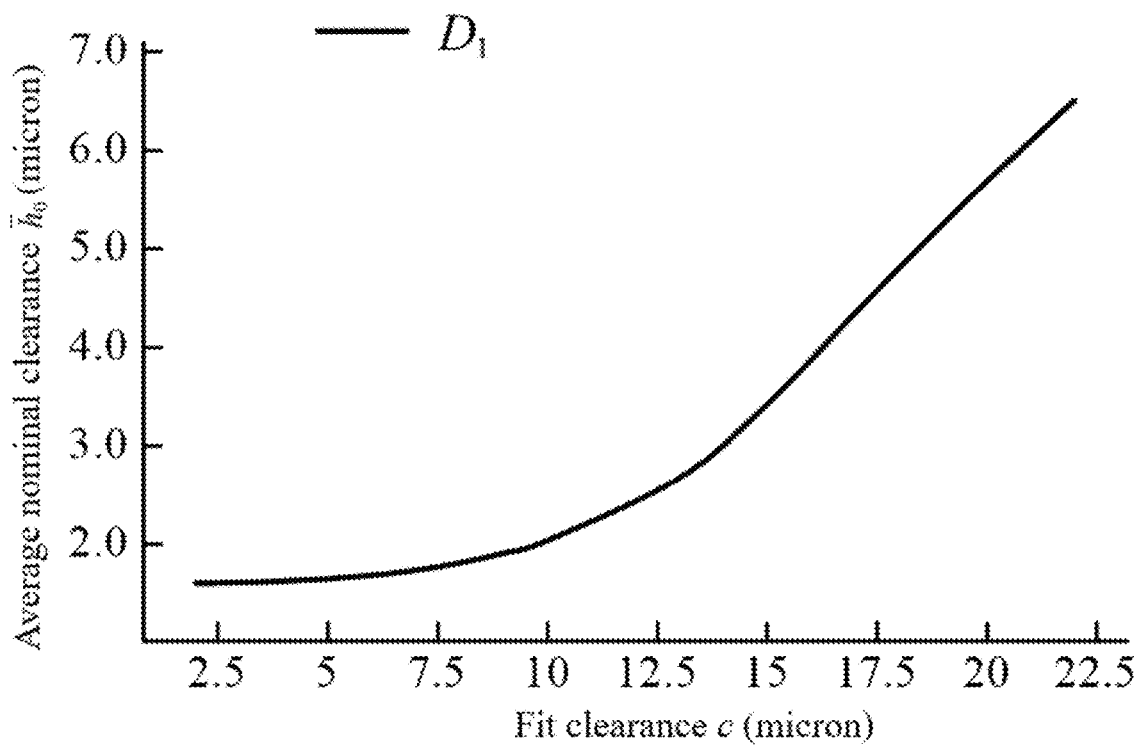
FIG. 8 is a changing curve of an average nominal clearance $\bar{h}_0$ with the fit clearance c when the diameter is $D_1$.
Figure 9:
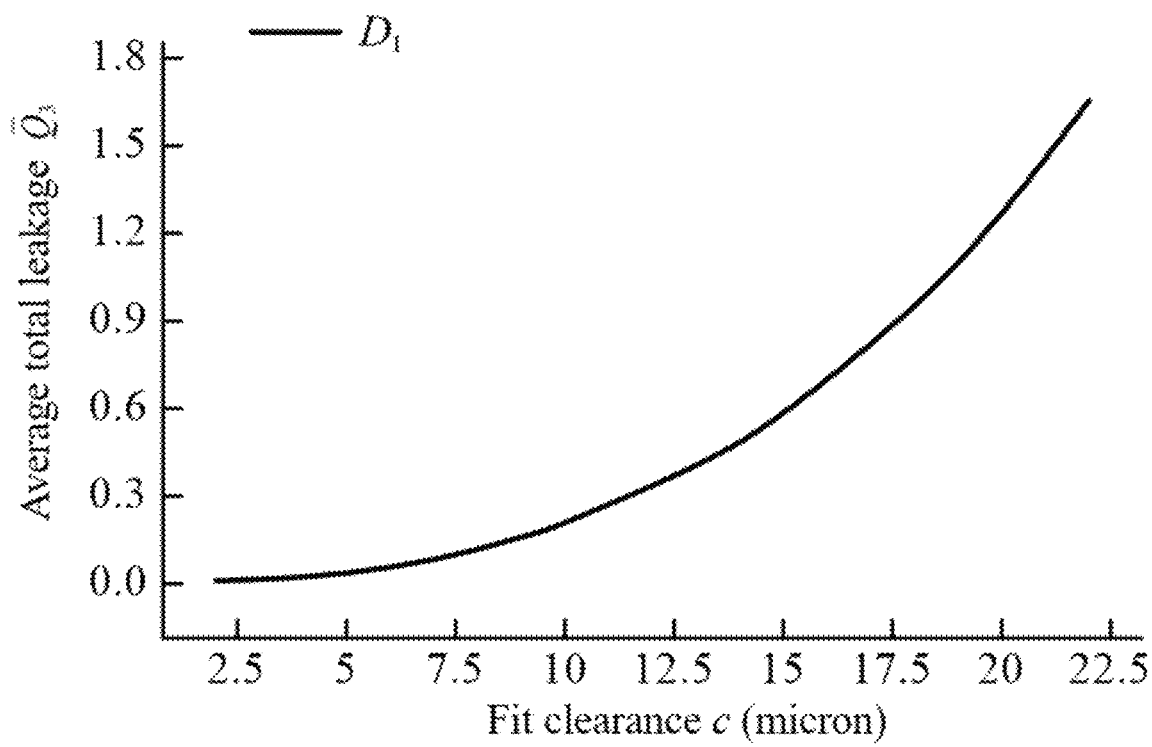
FIG. 9 is a changing curve of an average total leakage $\bar{Q}_3$ with the fit clearance c when the diameter is $D_1$.

Step 8: an average value of the curves obtained in step 7 after the distribution plate 4 works smoothly is obtained, and an average value of the data in the range of 175-270 degrees is taken for the data in FIG. 6 and FIG. 7 to obtain the changing curves of the average nominal clearance $\overline{h}_0$ and the average leakage $\overline{Q}_3$ with the fit clearance c and the diameter D; when the diameter D=16 mm, the changing curves of the average nominal clearance $\overline{h}_0$ and the average leakage $\overline{Q}_3$ with the fit clearance c are shown in FIGS. 8 and 9; a combination of the fit clearance c=5 microns and D=16 mm that has a minimum average leakage is selected as the final optimization result under a condition that $\overline{h}_0$ is ensured to be greater than $2\sqrt{f_1^2+f_2^2}$, and the design of the self-compensation structure is completed according to the final optimization result.

The above-mentioned examples are only used to describe the preferred embodiments of the present application, and do not limit the scope of the present application. Under the premise of not departing from the design spirit of the present application, various modifications and improvements made by ordinary technicians in the field to the technical solution of the present application shall fall within the protection scope determined by the claims of the present application.

What is claimed is:

1. A hydraulic motor with a self-compensation structure, comprising a self-compensation structure and a distribution plate;

wherein one side of the distribution plate is a distribution end face, and the other side of the distribution plate is provided with an oil inlet and an oil discharge port, the distribution end face of the distribution plate is pressed against a piston port end face of a cylinder block;

the self-compensation structure is a cylindrical cover structure, a right end of the self-compensation structure is pressed against a fixed shell of the hydraulic motor to achieve sealing of a balance chamber and to maintain internal pressure of the balance chamber, the oil in a high-pressure distribution window and a low-pressure oil distribution window of the distribution plate periodically enters the balance chamber to provide a leftwards pressing force for the distribution plate, the pressing force reduces a fit clearance between the distribution end face of the distribution plate and the piston port end face of the cylinder block, ensuring a sealing between the distribution plate and the cylinder block, the distribution plate moves along the self-compensation structure according to the force difference between left and right sides of the distribution plate to automatically adjust the distance between the distribution end face of the distribution plate and the piston port end face of the cylinder block, realizing the automatic compensation.

* * * * *